No. 872,691. PATENTED DEC. 3, 1907.
F. W. SEIDL.
SWIVEL.
APPLICATION FILED NOV. 14, 1905. RENEWED SEPT. 17, 1907.

Witnesses
H. G. Robinette
G. Ayres

Inventor
Frank W. Seidl.

By Marion & Marion
Attorneys.

UNITED STATES PATENT OFFICE.

FRANK W. SEIDL, OF MANITOWOC, WISCONSIN.

SWIVEL.

No. 872,691.  Specification of Letters Patent.  Patented Dec. 3, 1907.

Application filed November 14, 1905, Serial No. 287,286. Renewed September 17, 1907. Serial No. 393,325.

*To all whom it may concern:*

Be it known that I, FRANK W. SEIDL, a citizen of the United States, residing at Manitowoc, in the county of Manitowoc and State of Wisconsin, have invented certain new and useful Improvements in Swivels, of which the following is a specification.

My invention relates to swivels, especially adapted for watches, and it consists in the constructions, combinations and arrangements herein described and claimed.

The objects of my invention are to provide a simple and inexpensive form of swivel, which shall be durable in construction and positively lock in closed position with certainty.

Figure 1:
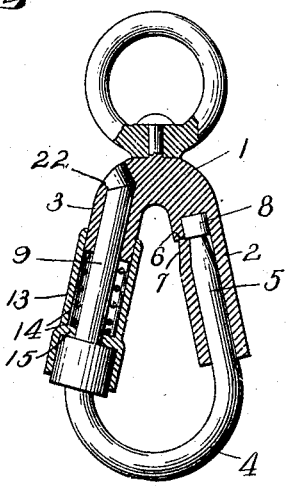
Figure 2:
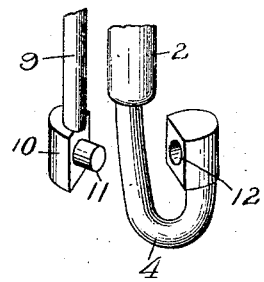
Figure 3:
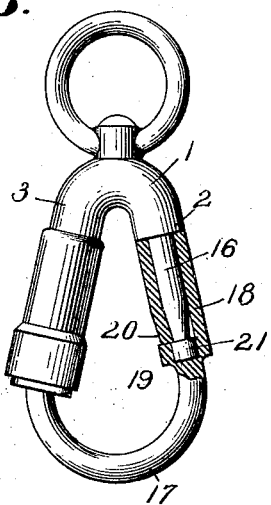

In the accompanying drawings, forming a part of this application and in which similar reference-symbols indicate corresponding parts in the several views: Figure 1 is a partial sectional view, illustrating one embodiment of my invention; Fig. 2 is a detailed perspective view, showing the interlocking faces on the hook and latch member, and Fig. 3 is a partial sectional view, illustrating a slightly modified construction.

Referring to the drawings, 1 indicates the body portion of a swivel, which is preferably formed with two legs 2 and 3. A hook 4 is provided with a headed shank 5 rotatably mounted in the leg 2. The leg 2 is shown slotted at 6 to permit deflection of a portion 7 of its wall into engagement with the head 8 of the shank; thus locking the shank against axial movement. A latch member 9 is shown rigidly secured to the leg 3, and provided with a head 10 formed with an interlocking face 11 adapted to coöperate with the similar face 12 on the hook. A sleeve 13 is shown slidably supported about the latch member 9; the upper and lower portions of said sleeve being guided, respectively, on the leg 3 and the head 10. A spring 14 is mounted within the sleeve between the end of the leg 3 and an annular flange 15 on said sleeve. The spring 14 thus tends to maintain the sleeve 13 in its extended position, with its flange, or stop, 15 in engagement with the head 10.

In assembling the above construction the sleeve 13 is placed on the latch 9 and the spring 14 positioned within said sleeve, after which, the latch 9 is driven in, or otherwise suitably secured to, the leg 3. As shown especially in Fig. 1, the bore in the leg 3 for receiving the latch member 9 is preferably formed with an off-set portion 22 for positively securing the parts together when said latch member is driven into said bore. The shank 5 of the hook is inserted in the leg 2, and a portion 7 of said leg is then bent, or deflected, inward into engagement with the head 8 of said shank to prevent axial displacement of the hook.

It will, therefore, be seen that my invention provides a simple and inexpensive construction which obviates the necessity of employing screws, or other means, for securing together the several parts thereof.

Fig. 3 illustrates a slightly modified construction, in which a headed pin 16 is driven in, or otherwise secured to, the leg 2 of the swivel body portion. In this construction, the hook 17 is provided with a hollow cylindrical portion 18 adapted to rotatably embrace the pin 16; said cylindrical portion being slotted at 19 to permit a part 20 thereof to be bent in into engagement with the head 21 of said pin.

The device is operated as follows: The swivel being open, as shown in Fig. 2, the hook 4 is inserted in the watch ring. It is then rotated on its axis until the projection 11 on the head 10 enters the opening in the head 12. In order to permit this, the sleeve 13 is pushed upwardly against the action of the spring. After the hook has been swung into contact with the member 9, the sleeve is released and permitted to drop over the head 10. The hook 4 is then securely locked.

Having thus described my invention, what I claim as new, and desire to secure by Letters Patent, is:

1. A swivel comprising a body portion, a hook rotatably secured thereto, means for preventing axial movement thereof, a latch member carried by said body portion and provided with a head for engaging said hook in closed position, a sleeve slidably supported about said latch member for locking the hook in engagement therewith, a stop carried by said sleeve for engaging the head of the latch member to limit the movement of said sleeve, and a spring mounted within said sleeve and bearing against said stop, substantially as described.

2. A swivel comprising a body portion, a hook rotatably secured thereto, means for preventing axial movement thereof, a latch member carried by said body portion and provided with a head for engaging said hook in closed position, interlocking faces on said latch and hook, a sleeve slidably supported about said latch member for locking the hook in engagement therewith, a stop carried by said sleeve for engaging the head of the latch member to limit the movement of said sleeve, and a spring mounted within said sleeve and bearing against said stop, substantially as described.

3. A swivel comprising a body portion, a hook having a headed shank rotatably mounted therein, a deflected part of the body portion arranged to engage the head of said shank for preventing axial movement thereof, a latch member carried by said body portion and provided with a head for engaging said hook in closed position, a sleeve slidably supported about said latch member for locking the hook in engagement therewith, a stop carried by said sleeve for engaging the head of the latch member to limit the movement of said sleeve, and a spring mounted within said sleeve and bearing against said stop, substantially as described.

4. A swivel comprising a body portion, a hook rotatably secured thereto, means for preventing axial movement thereof, a latch member carried by said body portion and provided with a head for engaging said hook in closed position, a sleeve slidably supported about said latch member for locking the hook in engagement therewith, an inner annular flange carried by said sleeve for engaging the head of the latch member to limit the movement of said sleeve, and a spring mounted within said sleeve and bearing against said flange, substantially as described.

In testimony whereof I affix my signature in presence of two witnesses.

FRANK W. SEIDL.

Witnesses:
JOHN CHLOUPEH,
HARVEY ECHTENACHER.